United States Patent
Eltchaninoff et al.

(10) Patent No.: US 8,290,831 B2
(45) Date of Patent: Oct. 16, 2012

(54) WEB-BASED DEMAND CHAIN MANAGEMENT SYSTEM AND METHOD

(75) Inventors: Ariane Eltchaninoff, Richardson, TX (US); Brad A. Foreman, Lewisville, TX (US); Patricia J. Johnson, Grand Prairie, TX (US); Charles K. King, Dallas, TX (US); Andre D. Laramore, Keller, TX (US); James R. Snow, Arlington, TX (US); Naohide Takatani, Irving, TX (US)

(73) Assignee: NEC Corporation of America, Irving, TX (US)

( * ) Notice: Subject to any disclaimer, the term of this patent is extended or adjusted under 35 U.S.C. 154(b) by 1148 days.

(21) Appl. No.: 09/954,206

(22) Filed: Sep. 18, 2001
(Under 37 CFR 1.47)

(65) Prior Publication Data

US 2003/0055712 A1 Mar. 20, 2003

(51) Int. Cl.
*G06Q 10/00* (2012.01)
*G06F 17/60* (2006.01)
(52) U.S. Cl. ............................................. 705/28; 705/10
(58) Field of Classification Search ............... 705/28–30
See application file for complete search history.

(56) References Cited

U.S. PATENT DOCUMENTS

| | | | |
|---|---|---|---|
| 6,341,269 B1 * | 1/2002 | Dulaney et al. | 705/22 |
| 6,609,101 B1 * | 8/2003 | Landvater | 705/10 |
| 7,092,929 B1 * | 8/2006 | Dvorak et al. | 705/28 |
| 2002/0169657 A1 * | 11/2002 | Singh et al. | 705/10 |
| 2004/0186794 A1 * | 9/2004 | Renz et al. | 705/28 |
| 2005/0075949 A1 * | 4/2005 | Uhrig et al. | 705/28 |
| 2009/0125385 A1 * | 5/2009 | Landvater | 705/10 |
| 2010/0205044 A1 * | 8/2010 | Scheer | 705/10 |

OTHER PUBLICATIONS

"DCM Solutions Files $7 Million Suit Against Headstrong/James Martin & Co. for Fraud, Misrepresentation, Breach of Contract Business Editors/High-Tech & Legal Writers", Business Wire, New York: Aug. 31, 2001.*

* cited by examiner

*Primary Examiner* — Garcia Ade
(74) *Attorney, Agent, or Firm* — Greenberg Traurig LLP (57) ABSTRACT

A system for forecasting demand includes a store client, an application for running a demand forecasting algorithm, a database providing store-level data to the application for the demand forecasting algorithm, wherein the store client communicates with the application, and an external interface providing future event information to the application, wherein the application manages ordering based on the demand forecasting algorithm using the future event information.

33 Claims, 6 Drawing Sheets

WEB-BASED DEMAND CHAIN MANAGEMENT SYSTEM AND METHOD

BACKGROUND OF THE INVENTION

1. Field of the Invention

The invention relates to a software-based method and system for forecasting store-level demand for products in a retail environment.

2. Discussion of the Related Art

Today, the static inventory models are based on high-level demographics and do not adjust product assortment by local store demand. Therefore, they are unable to dynamically react to rapidly changing consumer demands. In addition, there is limited capability to understand, on a store-by-store basis, the correlation between consumer demand and weather, local events, pricing, etc. At present, retailers make adjustments to accommodate such demand changes in a reactive mode. There is no existing process in place to proactively account for future causal factors, that will affect sales, or understand at the point of ordering the past consumer trends. This inability to more precisely anticipate future demand perpetuates a pendulum effect at retail, where shelves sway from over-stocked to under-stocked conditions.

For example, today's food retailers are unable to accurately track the profitability of the "fresh" areas of the store. They are suffering from low or no profit margins on areas like the deli, bakery and home meal replacement sections. Critical selling windows are not being calculated and therefore accurate forecasts and preparation quantities do not match with "time of day" buying habits of the consumer. In these areas the ordering, delivery schedules and preparation charts all reside in different locations. There is very little correlation between ingredient ordering, item preparation and the item's critical selling windows.

Accordingly, there is a need in the retail industry for a software system that addresses the problem of effective demand chain management.

SUMMARY OF THE INVENTION

Accordingly, the present invention is directed to a web-based demand chain management system and method that substantially obviates one or more of the problems due to limitations and disadvantages of the related art.

An object of the present invention is to provide a system and method for more efficient management of the inventory and the ordering process, particularly as it applies to the retail environment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a system for managing inventory including a store client, an application for running an inventory management algorithm, a database providing store-level data to the application for the inventory management algorithm, wherein the store client communicates with the application, and an external interface providing future event information to the application, wherein the application manages ordering based on the inventory management algorithm using the future event information.

In another aspect of the present invention there is provided a method of managing inventory including the steps of receiving sales, receipt, and adjustment data from a store client over the Internet on an application, accessing a database with the store-level sales, receipt, and adjustment data for an inventory management algorithm, and providing future event information to the application, and running an inventory management algorithm on the application based on the future event information and the store-level sales, receipt, and adjustment data.

In another aspect of the present invention there is provided a system for forecasting demand including a store client, an application for running a demand forecasting algorithm, a database providing store-level data to the application for the demand forecasting algorithm, wherein the store client communicates with the application, and an external interface providing future event information to the application, wherein the application manages ordering based on the demand forecasting algorithm using the future event information.

In another aspect of the present invention there is provided a method of managing inventory including the steps of receiving sales, receipt, and adjustment data from a store client over the Internet on an application, accessing a database with the store-level sales, receipt, and adjustment data for an inventory management algorithm, and providing future event information to the application, and running an inventory management algorithm on the application based on the future event information and the store-level sales, receipt, and adjustment data.

In another aspect of the present invention there is provided a method of managing inventory including the steps of receiving sales, receipt, and adjustment data from a store client over the Internet on an application, accessing a database with the store-level sales, receipt, and adjustment data for an inventory management algorithm, and providing future event information to the application, and running an inventory management algorithm on the application based on the future event information and the store-level sales, receipt, and adjustment data.

In another aspect of the present invention there is provided a method of forecasting demand including the steps of receiving store-level sales, receipt, and adjustment data from a store client over the Internet on an application, accessing a database with the store-level sales, receipt, and adjustment data for a demand forecasting algorithm, and providing future event information to the application, and running an inventory demand forecasting on the application based on the future event information and the store-level sales data.

In another aspect of the present invention there is provided a system for managing inventory including means for receiving sales, receipt, and adjustment data from a store client over the Internet on an application, means for accessing a database with the store-level sales, receipt, and adjustment data for an inventory management algorithm, and means for providing future event information to the application, and means for running an inventory management algorithm on the application based on the future event information and the store-level sales, receipt, and adjustment data.

In another aspect of the present invention there is provided a system for forecasting demand including means for receiving store-level sales, receipt, and adjustment data from a store client over the Internet on an application, means for accessing a database with the store-level sales, receipt, and adjustment data for a demand forecasting algorithm, and means for providing future event information to the application, and means for running an inventory demand forecasting on the application based on the future event information and the store-level sales, receipt, and adjustment data.

In another aspect of the present invention there is provided a computer program product for forecasting demand including a computer usable medium having computer readable program code means embodied in the computer usable medium for causing an application program to execute on a computer system, the computer readable program code means including computer readable program code means for receiving store-level sales, receipt, and adjustment data from a store client over the Internet on an application, computer readable program code means for accessing a database with the store-level sales, receipt, and adjustment data for a demand forecasting algorithm, and computer readable program code means for providing future event information to the application, and computer readable program code means for running an inventory demand forecasting on the application based on the future event information and the store-level sales, receipt, and adjustment data.

In another aspect of the present invention there is provided a computer program product for managing inventory including a computer usable medium having computer readable program code means embodied in the computer usable medium for causing an application program to execute on a computer system, the computer readable program code means including computer readable program code means for receiving sales, receipt, and adjustment data from a store client over the Internet on an application, computer readable program code means for accessing a database with the store-level sales, receipt, and adjustment data for an inventory management algorithm, and computer readable program code means for providing future event information to the application, and computer readable program code means for running an inventory management algorithm on the application based on the future event information and the store-level sales, receipt, and adjustment data.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

e-demand is an integrated merchandising ordering system that is centered on consumer demand. Its foundation is in the concepts of Demand Chain Management that are supported by hypothesis based ordering, identification of opportunity loss and organizational infrastructure support. It enables retailers to continually align vendors, products and services with customers' ever-changing wants and needs. It also helps retailers interpret the many factors influencing consumer purchases and delivers a methodical means of determining the right width and depth of products needed at each store.

The consumer wants and needs change according to many external influencing factors such as weather, events, exposure to advertising, socio-economic conditions, time-of-day, etc. Retailers face many challenges in anticipating, monitoring, and satisfying diverse and rapidly changing customers' demands. These changes are due to complex and inter-related factors that can be anticipated when historic and future information is available, and presented in a cohesive and correlative manner. Demand Chain Management is a method of effectively using information to anticipate the future in this rapidly changing and difficult-to-predict environment. Essentially, it is the first leg of the supply chain: beginning with the interpretation of the needs of the individual consumer based upon data available only at the point of purchase.

Demand Chain Management enables retailers, distributors and manufacturers to anticipate sales through a "hypothesize and verify" approach to ordering. Information is presented to allow the analysis of past sales trends, as well as the identification of future causal factors, to refine order quantities and to localize the appropriate product mix, width, and depth by retail location.

The benefits of e-demand include: increased sales, improved inventory turns, improved gross margins, reduction in slow moving merchandise, early introduction of beneficial new items, minimized write-offs, and out of stocks. By-products of these improvements are increased working capital, bottom-line profits and increased consumer satisfaction.

The benefits and improvements mentioned above are achieved by solving one of the major, critical business issues facing today's retailers: effective inventory control.

e-demand is a tool to stop the pendulum effect of over-stocked and under-stocked situations. e-demand presents store relevant information to allow for hypothesis based ordering at a granular level. Before the beginning of the next order cycle it presents the results of the previous hypothesis for verification. This verification then becomes the information for the new hypothesis for the next order cycle. e-demand is innovative in its approach in that it forces the retailer through a constant business cycle of hypothesis and verification. It is an opportunity, with a limited risk factor, to dynamically change product width and depth and to rapidly realize the full potential of the store and the consumer. This proactive approach allows the retailer to keep inventories at an optimum level and to reduce the problem of inventory control.

e-demand is also a tool to control the ingredient management and production schedules in volatile retail areas, e.g., "fresh" areas of a supermarket. e-demand is a tool that presents information on critical selling windows for items. It integrates a timely production schedule based on those critical windows; it also keeps track of ingredient usage and ordering requirements based on that usage. All of this information is calculated, and held, in one place for the retailer. This approach allows the retailer to again keep inventories at an optimum level and to reduce the problem of out of stocks, and more importantly in these areas, write-offs. Controlling write-offs is key to achieving profitability in these "fresh" areas.

e-demand provides information for proactive planning, merchandising, forecasting and ordering. Furthermore, e-demand utilizes web-based technology and emerging XML standards, in addition to EDI technologies, to offer the most accessible Demand Chain Management tool to the industry. The results enable partners and suppliers efficient access to shared, real information about their consumers. As a result, e-demand helps retailers better align their distribution and ordering cycles to better serve the needs of their consumer. This model allows retailers to offer the best customer experience and to exceed consumer expectations while controlling costly inventories. This optimization of the demand chain is a natural evolution for retailers and suppliers who are committed to the optimization of the supply chain.

Figure 1:
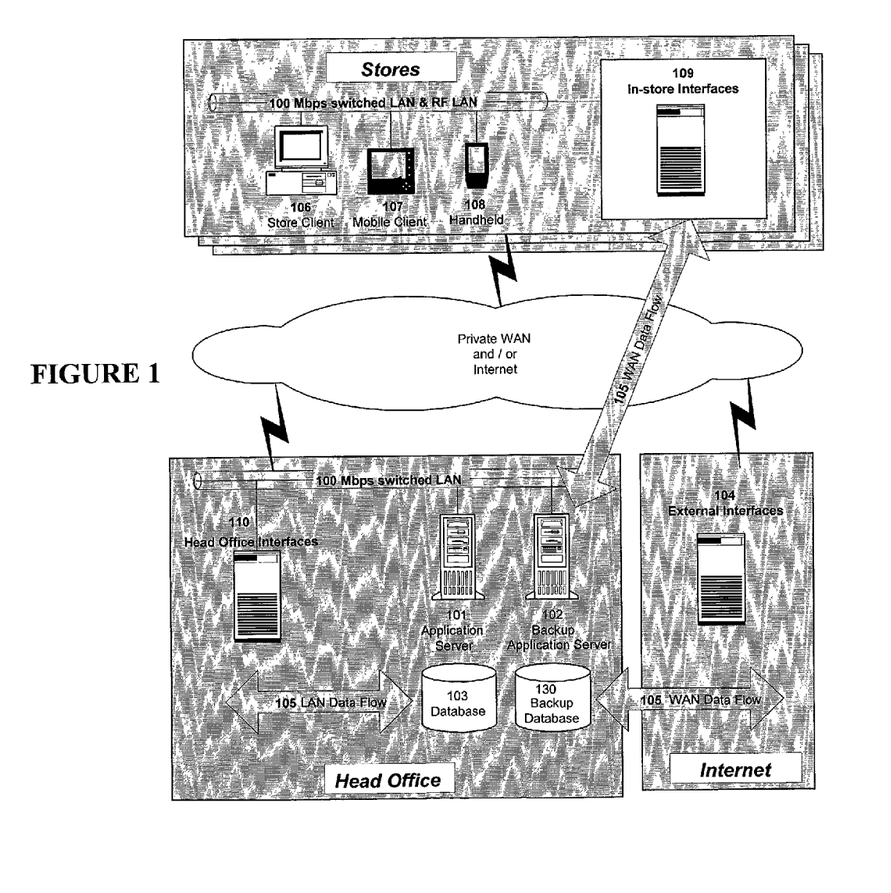
FIG. 1 illustrates a Head Office implementation with the application hosted at a corporate headquarters of a preferred embodiment.

FIG. 1 represents a Head Office implementation model for a retailer that wants to have the application hosted at its corporate headquarters.

As shown in FIG. 1, this implementation model has one or more servers 101, 102 physically residing at the Head Office location. These servers 101, 102 host the e-demand application, a database 103, a backup database 130, as well as a web server and backup servers where necessary. The servers 101, 102 also receive the relevant data from external sources, data such as item master files, accounting information and external messages. The servers 101, 102 also output data to external sources, data such as EDI or printable orders and internal messages. Each store accesses the Head Office-based servers 101, 102 through a LAN.

Additional external sources 104, 105 feed data to the Head Office servers 101, 102 from an Internet connection, such as the weather feed and events feed. The external sources 104, 105 are typically connected by a WAN 106.

FIG. 1 also represents an example of client hardware that may be available at two or more store locations. Each store may have one or more of the following hardware that has access to the Head Office servers 101, 102 through a private WAN or an Internet connection: store client 106, mobile client 107, and/or handheld scanner 108.

Figure 2:
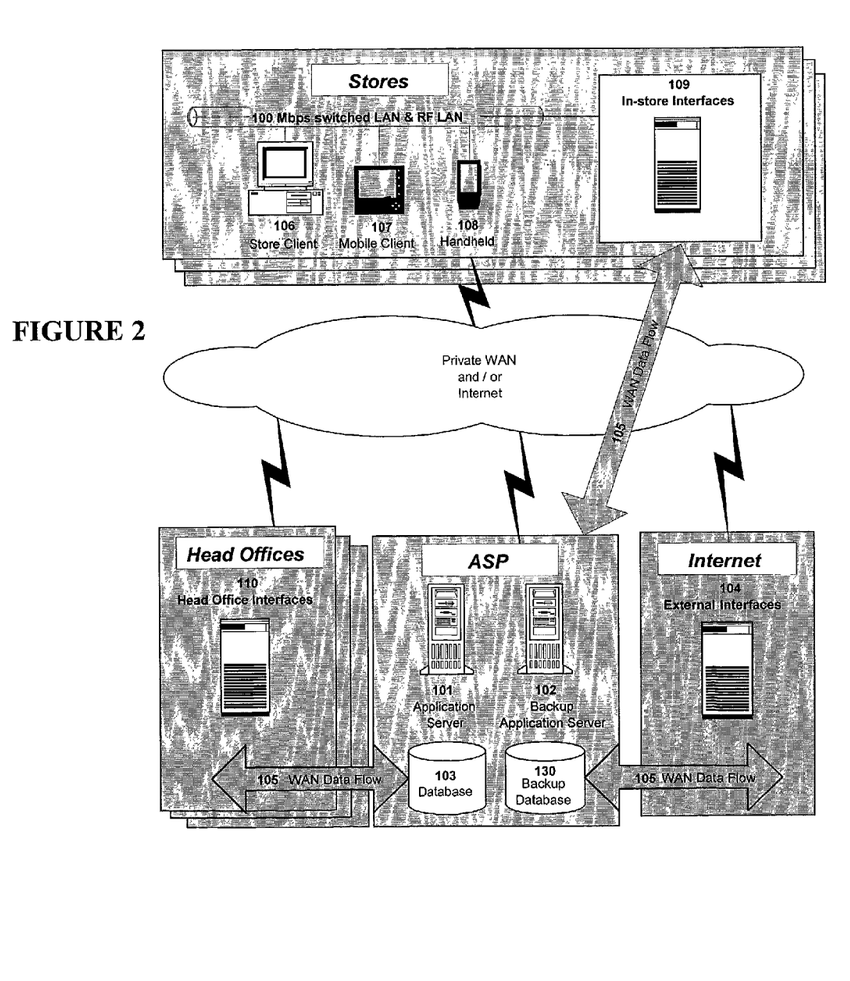
FIG. 2 illustrates an ASP implementation with the application hosted by a third party of the preferred embodiment.

FIG. 2 shows a representation of the ASP implementation model for a retailer that wants to have the e-demand application hosted by a third party.

As shown in FIG. 2, this model has one or more servers 101, 102 physically residing at a third party location. The servers 101, 102 host the e-demand application, the database 103, the backup database 130, as well as the web server and backup servers where necessary. The servers 101, 102 also receive the relevant data from the retailer's head office, data such as item master files, accounting information and external messages. The servers 101, 102 output the relevant data back to the head office servers data such as EDI orders and external messages from vendors, suppliers, etc. The Head Office-based servers access the ASP through a private WAN or Internet connection. FIG. 2 also shows some of the additional external sources 104, 105 that feed data through the ASP to the Head Office-based interfaces 110 from an Internet connection or private WAN, such as a weather feed and/or an events feed.

FIG. 2 thus shows the possible client hardware that may be available at two or more store locations that are connected to the ASP through a WAN connection or the Internet. Each store may have one or more of the following: hardware store client 106, mobile client 107, and/or handheld scanner 108.

Figure 3:
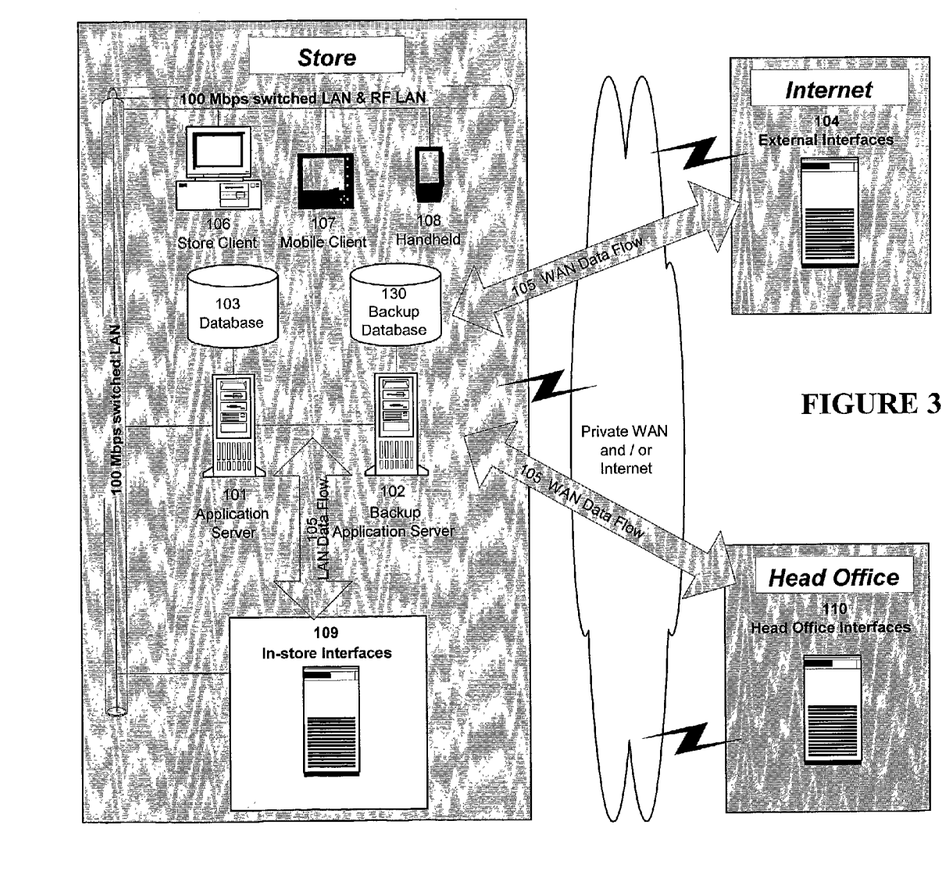
FIG. 3 illustrates a local store implementation of the preferred embodiment.

FIG. 3 shows a local store implementation model for a retailer that has only one store, or wants to have each of their stores run independently of each other using their own version of the application and their own database.

As shown in FIG. 3, this model has one or more servers 101, 102 physically residing at each store. The servers 101, 102 host the application, the database 103, the backup database 130, as well as the web server and backup servers where necessary. The servers 101, 102 receive any relevant data from external sources 104, 105 through an Internet connection or a private WAN 106. Store-located servers 101, 102 also output their own relevant data directly to the external sources 104, 105, data such as EDI orders and external messages to vendors, suppliers, etc. FIG. 3 also shows the possible client hardware that may be available at the store location. Each store may have one or more of the following hardware: store client 106, mobile client 107 or GOT (graphical order terminal) and handheld scanners 108. This hardware will be connected to the servers 101, 102 and 110 through a wired or RF LAN connection.

Some of the external sources 104, 105 that feed data to the store servers from an Internet connection or private WAN, such as the weather feed and events feed.

FIG. 3 also shows some of the external data that feeds to the store servers 101, 102 from the Head Office servers 110, if the retailer has 2 or more stores influenced by a head office location. This data flows to the store servers 101, 102 through an Internet connection or a private WAN.

Figure 4:
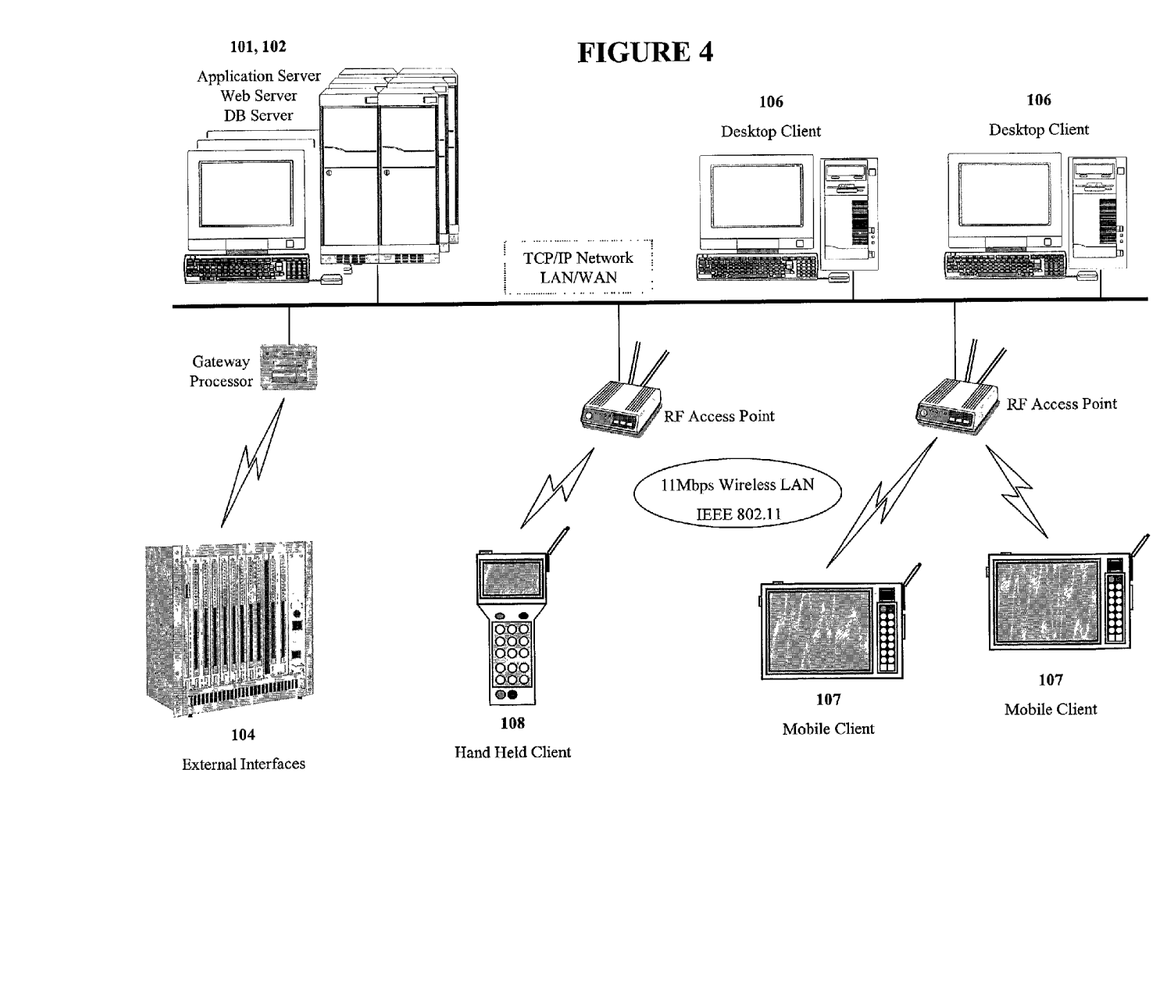
FIG. 4 illustrates a physical representation of a system architecture of the preferred embodiment.

FIG. 4 is a physical representation of the system architecture for any implementation of the application, whether it is hosted as an ASP model, implemented with a servers at a Head Office location, or whether it is deployed as a single store model.

FIG. 4 shows the servers 101, 102 that holds the application server, the database, the web server and the backup application and database where necessary. The servers 101, 102 run the store system and receive the relevant data from external systems 104, as well as communicate out to external systems. The servers 101, 102 communicate to external systems and internal clients through a LAN, private WAN or the Internet.

FIG. 4 also shows the in-store, desktop client(s) 106. The client(s) 106 is fed data and allows the user to interact with the e-demand application. A desktop client 106 is optional at the store location if a mobile client 107 is in use.

FIG. 4 also illustrates external systems that send or receive data from sources outside the e-demand system. External systems include master file feeds, messaging, Internet feeds, etc. These data transmissions will come to the servers through a gateway processor.

The handheld scanner 108 allows for perpetual inventory during the receiving process. The handheld scanner 108 connects to the servers 101, 102 through a RF access point and on to the internal LAN/WAN.

A GOT (graphical order terminal) 107 is fed data and allows the user to interact with the application. A GOT(s) 107 is optional at the store location if a desktop client 106 is in use. The GOT(s) 107 connect to the servers 101, 102 through a RF access point and on to the internal LAN/WAN.

Figure 5:
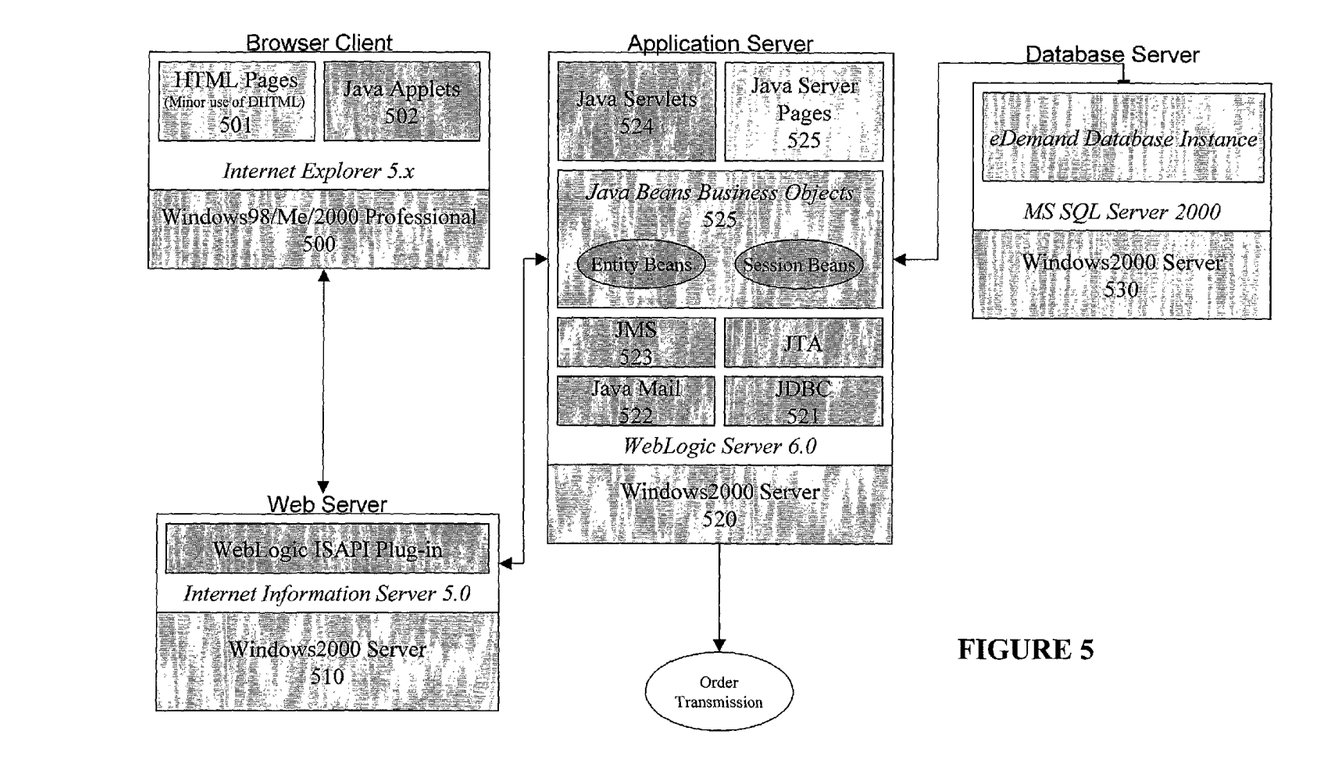
FIG. 5 illustrates a logical representation of the system architecture of the preferred embodiment.

FIG. 5 shows a logical representation of the system architecture for any implementation of the e-demand application, whether it is hosted as an ASP model, implemented with servers 101, 102 at a Head Office location, or whether it is deployed as a single store model.

A client 500 (which could be a store desktop 106, a mobile client 107, or a hand held 108) requires a Windows operating system and Internet Explorer version 5.x in the preferred embodiment. The client 500 uses HTML applets 501 and Java applets 502 to communicate with a web server 510.

Windows 2000 Server is used as the operating system and WebLogic for the web server 510 in the preferred embodiment, but any operating system (such as UNIX or LINUX) or web server (such as Apache) can be used. The web server 510 receives and process requests from the client 500 and then sends the requests to an application server 520.

For the application server 520, Windows 2000 Server is used as the operating system in the preferred embodiment, but any operating system such as UNIX, or LINUX can be used. The application server 520 processes requests and communicates with the web server 510 and a database server 530. The application server 520 includes a number of modules, such as JDBC (Java Database Connectivity) 521, Java Mail 522 (a gateway and protocol handler that converts Java format to HTPP), JMS 523 (Java Messaging Service), Java Servlets 524 (which provide server-side scripting), Java Beans 525, and Java Server Pages 525, and so on.

The database server 530 includes Microsoft SQL 2000 as the database 103 and the backup database 130 in the preferred embodiment, but the system also supports all major database applications (Oracle, SQL, Informix, DB2, and others).

Figure 6:
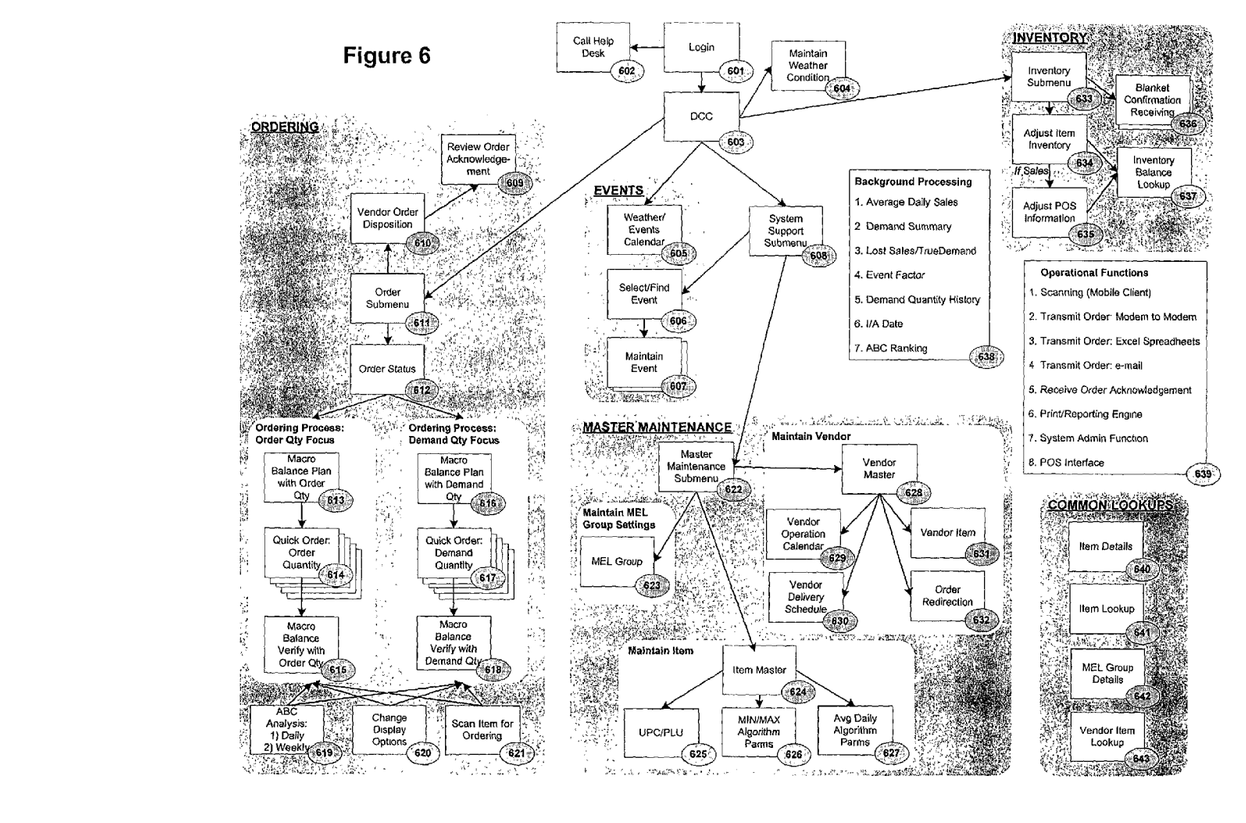
FIG. 6 shows a site map representation of the preferred embodiment.

FIG. 6 is a physical representation of the site map of e-demand.

As further illustrated in FIG. 6, the Login screen 601 is where the user begins interaction with e-demand. If the login is unsuccessful, the user will be moved to the Call Help Desk screen 602.

If the login is successful, the user will gain entry into the Demand Command Center (DCC) 603.

The DCC displays the following sections:

Performance Analysis—Performance Analysis displays the Sales Contribution Chart. This is a bar chart of actual sales performance.

Weather—Weather Forecast displays the overall weather condition for the next five days.

Messages—A listing of messages for the current user.

A portal 603 is used to access to all parts of the system. It allows access to all other areas of the system.

Maintain Weather Condition screen 604 is where weather information for the current week is displayed and the user can enter or update the weather condition. This includes:

Overall Weather Condition.
Time Period Weather Condition (morning, mid-day, and night).
Temperature High.
Temperature Low.
Heat Index.
Wind Chill.

Weather/Events Calendar screen 605 is where the user views all the events that affect any given day, and the duration of the event (past and future).

Select/Find Event screen 606 is where the user can view any events based on predefined search criteria.

Through the Maintain Events screen 607, the user can create or modifying an Event. Events can be classified as national, local, or any other retailer defined classification. This event information is used to formulate the ordering hypothesis. The following Event information is displayed, and are unique to the application:

Event Description
Event Type
Information Type
Category
Event Factor
Adjust History
Source.

System Support Submenu 608 provides a method of data entry to maintain information necessary for the application to process data correctly. The two areas accessible from Submenu 608 are Master Maintenance and Event Maintenance.

Review Order Acknowledgement screen 609 allows the user to review order acknowledgements that have been sent by the vendor.

Vendor Order Disposition screen 610 allows the user to view the status of all orders associated with a particular vendor.

Order Submenu screen 611 is a navigational screen that allows the user to enter the ordering menus as either a clerk or manager.

Using Order Status screen 612, all orders that are in the system are presented to the user, with the corresponding status. The order the user wants to work on is selected from the order status screen 612.

Macro Balance Plan screen includes an Order Quantity Focus process 613 and a Demand Quantity Focus process 616. For a selected order, a graph is presented to visually verify how well you executed the ordering process in previous order cycles, how the category has been trending, and how the system predicts the order amount for this current order cycle. Use this information, presented on the Macro Balance Plan screen to form a hypothesis as to how the MEL Group will trend in the future. This information is used to predict demand.

Quick Order Ouantity screen includes an Order Quantity Focus process 614 and a Demand Quantity Focus process 617. This is where an order is created. The Quick Order Quantity screen contains the following tabs:

| This Tab... | Displays... |
|---|---|
| Order Quantity | Actual order from previous order cycles. |
| Fulfilled Demand | Actual sales (in units) for completed order cycles. |
| Write Offs | Amount of lost inventory due to lack of demand. |
| Deliveries | Total number of units delivered per order cycle. |
| Adjustments | Amount of lost inventory due to other reasons beside demand. |

Macro Balance Verify screen includes an Order Quantity Focus process 615 and a Demand Quantity Focus process 618. For the completed order a graph is presented to visually compare how the actual order compared to what was planned, based on the information presented in process 613/616, therefore verifying the actual order against the plan.

ABC Analysis screen 619 is accessible from both ordering processes (the Order Quantity Focus 615 and the Demand Quantity Focus 618). It provides a graphical representation of the ABC Analysis (either daily or weekly view).

Change Display Options screen 620 is accessible from both ordering processes. It allows the user to switch between the two ordering processes.

Scan Item for Ordering screen 621 is accessible from both ordering processes. It allows the user to scan in the UPC of the item they wish to order.

Master Maintenance Submenu screen 622 is a navigational screen that allows the user to enter the master maintenance menus as either a clerk or manager.

MEL Group screen 623 is a maintenance screen that allows the user to adjust the settings for a particular MEL Group.

Item Master screen 624 displays detailed information about an item and allows maintenance of that information, categorized into the following sections, which are unique to the application:

Item Code, Item Description, Order Start Date and Order Stop Date, Auto Order Start and Auto Order Stop Date, Order Quantity Minimum, Order Maximum, On-Hand for Display, Auto Order Calculation Method, Absolute Minimum, Absolute Maximum, Min/Max Calculation, Rounding Method, Suggested Order Qty Source, Item Requires Review and Allow Default Order Qty.

Item Master Screen 624 allows access to the following: UPC/PLU, MIN/MAX Algorithm Parameters and Average Daily Algorithm Parameters.

Vendor Master screen 628 displays detailed information about a vendor and allows maintenance of that information. It allows the user to access the following: Vendor Operation Calendar 629, Vendor Delivery Schedule 630, Vendor Item 631, and Order Redirection 632.

Inventory Submenu screen 633 is a navigational screen that allows the user to enter the inventory menus as either a clerk or manager.

Adjust Item Inventory screen 634 is used to make inventory adjustments of any kind. Inventory adjustments for one or more items given a particular activity and reason are accounted for on this screen. Successful completion of an adjustment will result in updating the inventory amount for On Hand and On Order (where applicable) and Transaction History of the adjusted item.

Adjust POS Information screen 635 is used when an adjustment for an item is associated with a sale or sale return then the POS Information must be adjusted as well. This screen allows for those adjustments.

Blanket Confirmation Receiving screen 635 allows the retailer to perform a blanket confirmation of delivery receipts.

Inventory Balance Lookup screen 637 allows the retailer to view the balance of inventory for a specific item in report format.

Background processing 638 performed by the system includes:

Average Daily Sales—Daily sales are averaged and used by the ordering algorithms. This information is also presented graphically.

Demand Summary—Demand is summarized based on time periods selected by the user. This information is also presented graphically.

Lost Sales/TrueDemand—Lost sales are calculated and used to determine TrueDemand. TrueDemand is demand plus sales that would have occurred if the item had not been out of stock (lost sales). This information is also presented graphically.

Event Factor—The Event Factor is a percentage that is used by the ordering algorithms to determine the order quantity that is needed to fulfill forecasted demand.

Demand Quantity History—This history is used by the ordering algorithms to determine the order quantity that is needed to fulfill forecasted demand.

I/A Date—This is a date that is entered into the system and is used to tell the system when to begin consideration of a particular event or demand influencer.

ABC Ranking—All items are ranked based on daily sales. This information is presented graphically in either a weekly or daily view. It can also be presented in either ABC (best to worst) or CBA (worst to best) order.

Operational Functions 639 supported by the system include, for example:
Scanning (mobile client)
Transmit Order (modem-to-modem)
Transmit Order (Excel spreadsheets)
Transmit Order (e-mail)
Receive Order Acknowledgement
Print/Reporting Engine
System Administration Function
POS Interface
Common Lookups: the common lookups include Item Details 640, Item Lookup 641, MEL Group Details 642, and Vendor Item Lookup 643.

Demand Equations

There are five equations that are central to Ordering. These are Daily Demand, Total Demand, Hypothesized Order Quantity, Actual Order Quantity, and Supply. Each equation is persisted in the system in three different states: System Generated, Used and/or Simulated.

System Generated—Calculated as part of the ordering process. The result of this equation is saved and not able to be modified by the user. The result of the System Generated equation is used to suggest an order quantity. It is also compared to the result of the Used equation for statistics and metrics.

Used—Calculated as the user is working with the system. The result of this equation represents the work in progress as well as the final quantity that is used and saved.

Simulated—Calculated while using the Demand Calculator. The Demand Calculator allows the user to complete "what if" scenarios without affecting the result of the System Generated equation or the result of the Used equation but can be used as the order quantity.

The table below further explains the demand equations:

| Equation Name | Mathematical Term | Mathematical Term per State | | |
|---|---|---|---|---|
| | | System Generated | Used | Simulated |
| Daily Demand | $h_n$ | $h_n(sys)$ | $h_n(used)$ | $h_n(sim)$ |
| Total Demand | H | H(sys) | H(used) | H(sim) |
| Hypothesized Order Quantity | HOQ | HOQ(sys) | HOQ(used) | HOQ(sim) |
| Actual Order Quantity | AOQ | AOQ(sys) | AOQ(used) | AOQ(sim) |
| Supply | Supply | Supply(sys) | Supply(used) | Supply(sim) |

Equation Definitions

Daily Demand: $h_n$, $h_n(sys)$, $h_n(used)$, $h_n(sim)$

This represents one period demand (sales) in the Order Cycle. If there were five periods in the Order Cycle, then
Day 1=$h_1$
Day 2=$h_2$
Day 3=$h_3$
Day 4=$h_4$
Day 5=$h_5$ Total Demand: H, H(sys), H(used), H(sim)

This is the sum of the Period Demand. If there were five periods in the Order Cycle, then $$H=h1+h2+h3+h4+h5$$

Hypothesis Order Quantity: HOQ, HOQ(sys), HOQ (used), HOQ(sim)

Order Quantity amount used to meet the demands of the Order Cycle. HOQ is calculated from:

$$HOQ=H+M-I$$

Where:
  H=Total Demand, M=Minimum Display, I=Inventory Position

Actual Order Quantity: AOQ, AOQ(sys), AOQ(used), AOQ(sim)

This is the order quantity sent to the Vendor. This is calculated by applying business rules and vendor constraints.

$$AOQ=\text{Validated}(HOQ)$$

Applying business rules and Vendor Constraints recalculates this equation.

Validation is calculated by the following two rules:

If Actual Order Quantity AOQ(used) is outside Min/Max Order Quantity range (master), the Actual Order Quantity AOQ(used) will be set to minimum, if below, or be set to maximum, if above. The Application changes Actual Order Quantity AOQ(used) to rounded quantity nearest to the Max or Min accordingly.

If Actual Order Quantity AOQ(used) is not a multiple of the Derived Lowest Deliverable Unit (LDU) for the item, the application automatically rounds quantity based on the item's Default Rounding Method. If no Default Rounding Method is configured for the item, then application displays a message notifying the user that quantity must be rounded and prompts the user to choose between two order quantities: 1) the closest LDU multiple that is less than the order quantity, and 2) the closest LDU multiple that is greater than the order quantity. After the user makes a choice, the updated order quantity is displayed Supply Equation: Supply, Supply(sys), Supply(used), Supply(sim)

This is the amount of demand that will be satisfied based off of vendor constraints and business rules.

$$Supply = AOQ - Minimum\ Display + Inventory\ Position$$

Performance Analysis Calculations

Overview

In the preferred embodiment, during batch processing, the system will identify the IA date and then calculate demand information for all items. All information will be calculated hourly and daily, except for Actual Event Factor, which is only calculated daily. The information available through these calculations include Sales in Units and Amount, Lost Sales in Units and Amount, True Demand in Units and Amount, and Actual Event Factor (as a percentage).

Calculations

Sales in Units by Hour

The total recorded unit sales of an item for any hour (obtained from the POS file/interface).

Sales in Units by Day

The sum of recorded Sales in Units by Hour for an item for a full day.

Lost Sales in Units by Hour

If there is a full hour of OOS condition and there are no event factor(s) associated to that item then Lost Sales in Units by Hour=daily average by day of week by hour. This information is rolled up to determine lost sales in units by day.

If there is a full hour of OOS condition and there are event factor(s) associated to that item then Lost sales in units by hour=(rolling daily average by day of week by hour)+(rolling daily average by day of week by hour*event factor percent). This information is rolled up to determine lost sales in units by day.

If there is no OOS condition during any hour the lost sales in units by hour=0 Lost Sales in Amount by Hour Lost Sales in Amount by Hour=Lost Sales in Unit by Hour*Store Item Retail Prince If there is an OOS condition that occurs, or is corrected, within a one hour window the system will not consider that item to have been OOS anytime during that one-hour window. No lost sales will be reported during that hour.

True demand in units by hour

True demand in units by hour=Lost sales in units by hour+Sales by unit by hour

This information is rolled up to determine True demand in units by day.

Adjusted true demand in units by hour

Adjusted true demand in units by hour=((Sales in units by hour*(1+(actual event factor))+rolling daily average by day of week by hour.

This information is rolled up to determine Adjusted True demand in units by day.

True Demand in Units by Hour and Adjusted True Demand by units by hour apply to amount by hour and by day.

Actual Event Factor Calculation

Actual event factor %=Sales by unit by day−rolling daily average by day of week/rolling daily average by day of week× 100.

When there is more than one event factor associated with an item we cannot identify how much of the percentage can be attributed to the individual events. We can only associate the events as one lump factor %.

If a sale transaction is recorded for an item after the on hand inventory was recorded as 0, and before a recorded delivery, then the OOS conditions must be reversed for the time period between the on-hand inventory going to 0 and the sale was recorded.

OOS % Calculation

The OOS calculation for an item is as follows:

$$\text{\# of hours item is out of stock/\# of hours store is open}*100 = OOS\ \%$$

An item is considered out of stock for the full hour if it is OOS for any portion of that hour.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A system for managing inventory comprising:
   a store client;
   a computing system comprising at least one computing device, said computing system running an application for running an inventory management algorithm;
   non-transitory computer-readable medium storing a database providing store-level data to the application for the inventory management algorithm, wherein the store client communicates with the application; and
   said computing system being configured to provide an external interface providing future store-level event information to the application,
   wherein the application for running an inventory management algorithm manages ordering based on the inventory management algorithm using the future store-level event information,
   wherein the inventory management algorithm associates the store-level data with an actual event factor percentage, wherein the actual event factor percentage is based upon daily sales and daily averages,
   wherein the application localizes an appropriate product mix, width, and depth by store client.

2. The system of claim 1, wherein the future store-level event information includes a weather forecast.

3. The system of claim 1, wherein the future store-level event information includes at least one of local event, regional event, national event, and other event information.

4. The system of claim 1, wherein the future store-level event information includes promotion information.

5. The system of claim 1, wherein the future store-level event information includes at least one of local holiday information, and national holiday information.

6. The system of claim 1, wherein the future store-level event information includes a retailer-defined event.

7. The system of claim 1, wherein the external interface that provides future store-level event information is connected to the application.

8. The system of claim 1, wherein the store client includes a desktop client.

9. The system of claim 1, wherein the store client includes a mobile client.

10. The system of claim 1, wherein the store client includes a handheld client.

11. The system of claim 1, wherein the store client communicates with the application over the Internet.

12. The system of claim 1, wherein the store client communicates with the application over a WAN.

13. The system of claim 1, wherein the database includes historical sales data.

14. The system of claim 1, wherein the database includes customer demographic data.

15. A method of managing inventory comprising the steps of:
Receiving, in a computing system comprising at least one computing device, data from a store client over the Internet on an application;
using said computing system to access a database with the store-level data for an inventory management algorithm;
using said computing system to provide future store-level event information to the application; and
running, on said computing system, an inventory management algorithm on the application based on the future store-level event information and the store-level data,
wherein the inventory management algorithm associates the store-level data with an actual event factor percentage, wherein the actual event factor percentage is based upon daily sales and daily averages,
wherein the application localizes an appropriate product mix, width, and depth by store client.

16. The method of claim 15, wherein the future store-level event information includes a weather forecast.

17. The method of claim 15, wherein the future store-level event information includes at least one of local event, regional event, national event, and other event information.

18. The method of claim 15, wherein the future store-level event information includes promotion information.

19. The method of claim 15, wherein the future store-level event information includes at least one of local holiday information, and national holiday information.

20. The system of claim 15, wherein the future store-level event information includes a retailer-defined event.

21. The method of claim 15, wherein the store client is connected to an in-store interface that provides point of sale information.

22. The method of claim 15, wherein the store client includes a desktop client.

23. The method of claim 15, wherein the store client includes a mobile client.

24. The method of claim 15, wherein the store client includes a handheld client.

25. The method of claim 15, wherein the database includes store-level historical sales data.

26. The method of claim 16, wherein the database includes store-level customer demographic data.

27. A system for managing inventory comprising:
a computing system comprising at least one computing device, said computing system being configured to receive data from a store client over the Internet on an application;
said computing system being configured to access a database with the store-level data for an inventory management algorithm;
said computing system being configured to provide future store-level event information to the application; and
said computing system being configured to run an inventory management algorithm on the application based on the future store-level event information and the store-level data,
wherein the inventory management algorithm associates the store-level data with an actual event factor percentage, wherein the actual event factor percentage is based upon daily sales and daily averages,
wherein the application localizes an appropriate product mix, width, and depth by store client.

28. The system of claim 27, wherein the future store-level event information includes at least one of a weather forecast, local event, regional event, national event, other event, an individual store promotion information, a retailer-defined event, local holiday information, and national holiday information.

29. The system of claim 27, wherein the means for receiving receives point of sale information.

30. The system of claim 27, wherein the store client includes at least one of a desktop client, a mobile client, and a handheld client.

31. The system of claim 27, wherein the store client communicates with the application over at least one of the Internet, a LAN, and a WAN.

32. The system of claim 27, wherein the database includes at least one of past sales data and customer demographics.

33. A computer program product for managing inventory comprising:
a non-transitory computer usable medium having computer readable program code embodied in the computer usable medium for causing an application program to execute on a computer system, the computer readable program code comprising:
computer readable program code for receiving data from a store client over the Internet on an application;
computer readable program code for accessing a database with the store-level data for an inventory management algorithm;
computer readable program code for providing future store-level event information to the application; and
computer readable program code for running an inventory management algorithm on the application based on the future store-level event information and the store-level data,
wherein the inventory management algorithm associates the store-level data with an actual event factor percentage, wherein the actual event factor percentage is based upon daily sales and daily averages,
wherein the application localizes an appropriate product mix, width, and depth by store client.

* * * * *